United States Patent [19]
Huebner et al.

[11] 3,930,451
[45] Jan. 6, 1976

[54] ROADWAY FOR HIGH PERFORMANCE RAPID TRANSIT RAILWAYS

[75] Inventors: Werner Huebner, Roehrmoos; Michael Simon, Munich-Obermenzing; Peter Wagner, Mainz, all of Germany

[73] Assignee: Michael Simon, Munich-Obermenzing, Germany

[22] Filed: Aug. 9, 1973

[21] Appl. No.: 387,149

[30] Foreign Application Priority Data
Aug. 12, 1972 Germany............................ 2239656

[52] U.S. Cl. ......... 104/123; 104/118; 104/148 LM; 104/124
[51] Int. Cl.² ......................................... B61B 13/08
[58] Field of Search .............................. 104/89–95, 104/118, 123, 138 R, 124, 148 MS, 148 LM

[56] References Cited
UNITED STATES PATENTS

| | | | |
|---|---|---|---|
| 3,090,326 | 5/1963 | Goodell | 104/124 |
| 3,233,559 | 2/1966 | Smith | 104/148 LM |
| 3,616,763 | 11/1971 | Colling | 104/148 LM |
| 3,738,280 | 6/1973 | Barthalon | 104/123 |
| 3,774,542 | 11/1973 | Walsh | 104/123 |
| 3,776,141 | 12/1973 | Gelhard | 104/138 R |

FOREIGN PATENTS OR APPLICATIONS
1,537,842  7/1968  France .......................... 104/148 MS Primary Examiner—M. Henson Wood, Jr.
Assistant Examiner—D. W. Keen
Attorney, Agent, or Firm—Wolfgang G. Fasse; Willard W. Roberts

[57] ABSTRACT

A roadway for rapid transit railways comprises concrete or reinforced concrete piers supporting an all steel support or suspension structure for the support and/or suspension as well as guiding of the vehicles.

14 Claims, 8 Drawing Figures

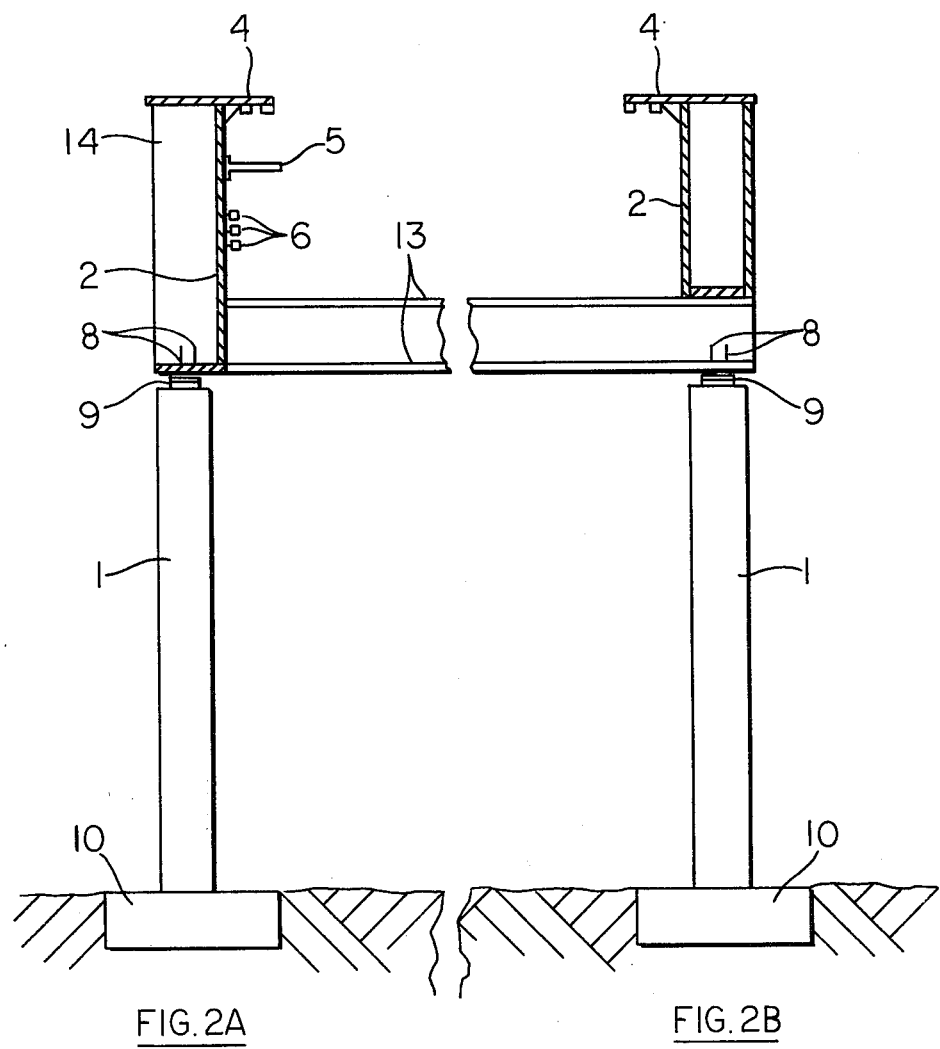

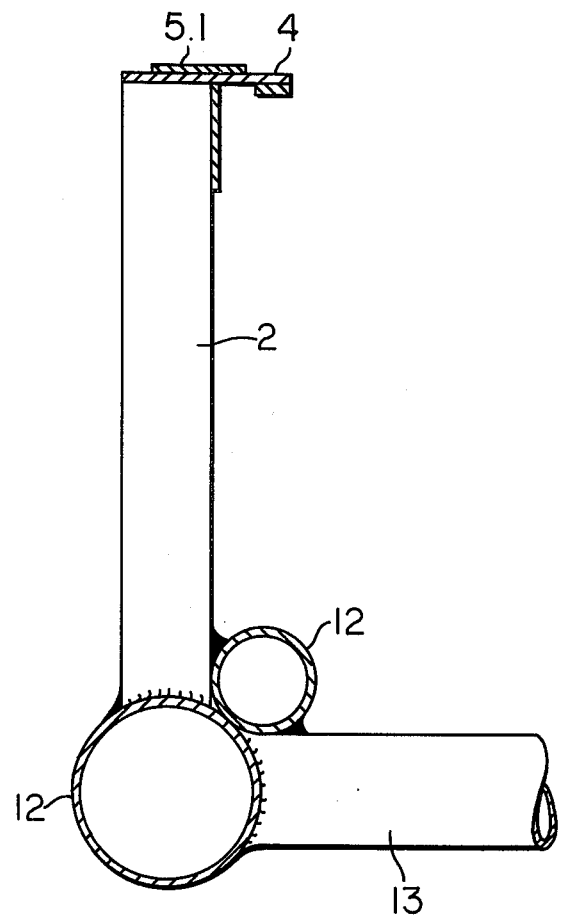

ROADWAY FOR HIGH PERFORMANCE RAPID TRANSIT RAILWAYS

BACKGROUND OF THE INVENTION

This invention relates to roadways for high performance rapid transit railways for overhung and/or underhung suspension vehicles including a suspension or supporting structure with means for carrying and guiding of the vehicles.

Conventional constructions of such roadways utilize reinforced concrete supporting or suspension structures, and the various rails and lines needed to sustain railway operations are attached to the suspension or supporting structures. In order to maintain the close tolerances needed to ensure the operability of overhung or underhung suspension vehicles, in the relative arrangement of the individual rails as well as in the absolute geometry of the track, these structures necessitate separately operable adjusting devices for the concrete main beams as well as for the rails attached thereto by means of supporting elements. Such structures thus require rather large expenditures and are hence expensive.

Due to the particular load capacity of main beams of reinforced concrete construction, these beams, if reasonably sized, may not exceed approximately 30 m in span. This poses special problems when track sections require a span length in excess of 30 m, as may be the case for bridges and overcrossings.

When the track section involves bends in the roadway or differences in elevation, conventional structures necessarily use traverse or polyonal courses in the section to approximate such bends in the suspension beams.

A further disadvantage of prior art structures utilizing concrete suspension structures, is seen in that these cannot be manufactured by shop production, but must be manufactured at the site. This entails relatively high labor costs. Another disadvantage is seen in that these reinforced concrete structures are hard to disassemble for re-use, for example, when the system is to be relocated. This is important in the case of experimental tracks. A still further disadvantage of conventional structures is due to the fact that the necessary high resonance frequency can be achieved only at high extra costs for respective structural features.

OBJECTS OF THE INVENTION

It is an object of the present invention to provide roadways for rapid transit railways for overhung or underhung suspension vehicles which eliminate the above cited disadvantages while satisfying to maximum advantage the requirements imposed on modern rapid transit roadways.

A particular object of this invention is to achieve these advantages by providing a suspension structure which, except for the piers, is a steel construction.

SUMMARY OF THE INVENTION

For achieving the above objects there is provided in accordance with the invention a roadway for high performance rapid transit railways comprising an all-steel suspension structure for the suspension and guidance of the vehicles. The piers supporting the all-steel suspension structure may be, for example, of either concrete or steel or reinforced concrete.

In a further embodiment of this invention the main beam, or beams, is either solid-walled or trussed.

In a still further embodiment of this invention the suspension structure comprises two oppositely arranged main beams of box section which are interconnected by cross-ties in the area of the piers or columns only. In this arrangement the torsional moments caused by lateral forces are directly absorbed by the box-section main beams. It will therefore be sufficient if the two main beams are interconnected by cross-ties to absorb lateral forces only in each pier or column area. By "piers" the substantially vertically extending supporting columns are ment.

In yet another embodiment of this invention the steel construction of the suspension structure is of the open cross-section type where two oppositely disposed main beams are interconnected by cross-bracing means at their lower or downwardly facing sides. By this construction the torsional moments produced by lateral forces are no longer taken up solely by the cross-sections of the main beams, but rather by the entire suspension structure. This will greatly economize material consumption and thus reduces costs.

In still another embodiment of this invention the armature reaction rails of steel, which are needed when the suspension and guide means are electromagnetic, are integrated into the steelwork of the suspension structure as load-bearing components, by rigidly attaching them to the main beams. This feature again saves material and reduces costs accordingly, it also lessens the total number of parts requires for the suspension structure. The same advantages result when, in a further aspect of this invention, the steel portion of the reaction rails needed, where propulsion is by unilaterally acting electrical linear motor, is integrated into the steelwork of the suspension structure by rigidly attaching the reaction rails to the main beams. The attachment may be by a welded, bolted and/or riveted connection.

In a further embodiment of this invention the non-steel parts of the linear motor reaction rails simultaneously serve as conductors for the electrical power supply. This eliminates the need for installing separate power lines in the suspension structure, and again affords savings in material, cost and weight.

In a still further embodiment of this invention, pipe line systems for transmitting liquids, gases, fluidized solids, transport containers and electrical superconducting long-distance lines are incorporated into the suspension structure as load-bearing components. This provides an opportunity to incorporate, to best advantage, load-bearing components into the suspension structure which in the shape of tubing systems concurrently serve for conveying or similar functions.

BRIEF FIGURE DESCRIPTION

In order that the invention may be clearly understood it will now be described, by way of example, with reference to the accompanying drawings, wherein:

FIGS. 2a and 2b are sectional views illustrating two embodiments of a roadway in accordance with this invention;

FIG. 6 is a cross sectional view of a suspension structure in accordance with a further embodiment of the invention, in which tubular elements are employed as the load-bearing elements.

DETAILED DESCRIPTION OF EXAMPLE EMBODIMENTS

Figures 1A, 1B:
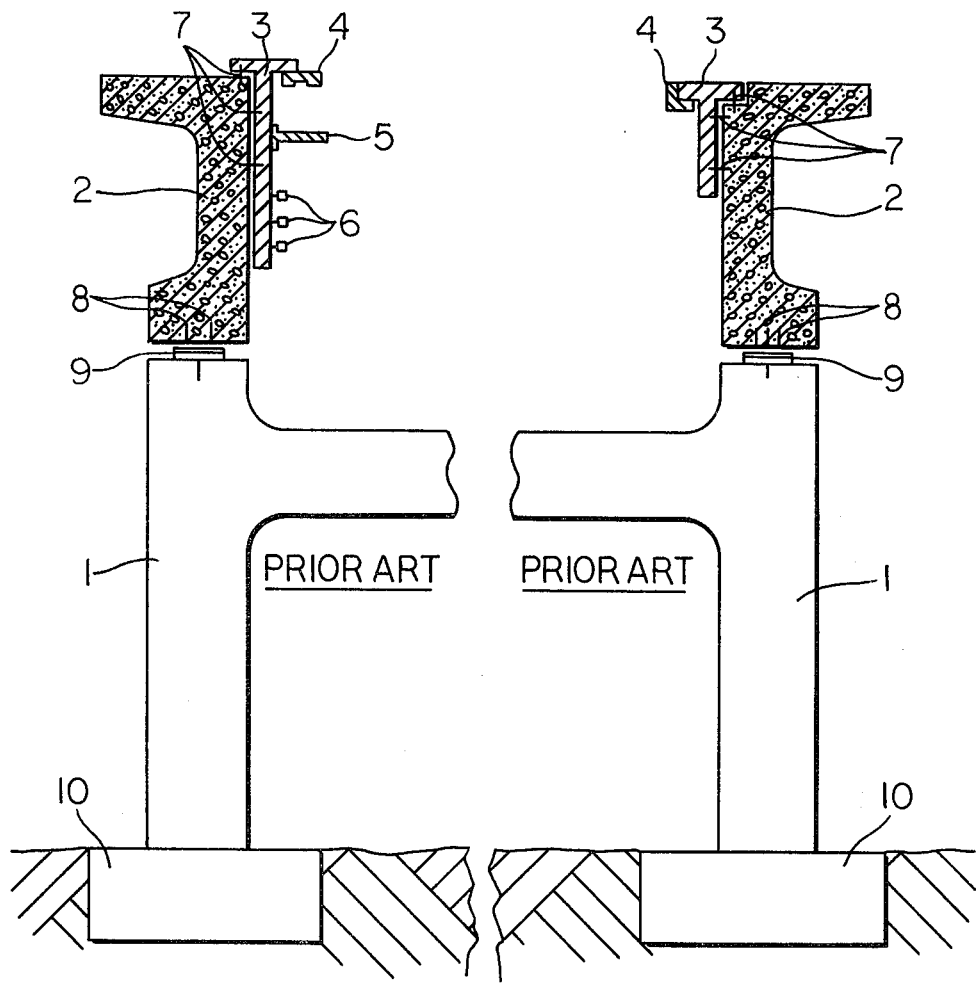
FIGS. 1a and 1b are sectional views illustrating two embodiments of a roadway in conformance with the prior art.

FIGS. 1a and 1b illustrate different conventional, reinforced concrete suspension structures, where concrete piers 1 resting on foundation 10 carry reinforced-concrete main beams 2 on bearings 9. The bearings 9 take up horizontal and vertical forces. The main beams 2 carry intermediate supporting members 3.

These intermediate supporting members 3 serve for attaching and supporting suspension and guide means which in FIGS. 1 to 6, for example, are electromagnetic for the vehicular propulsion by means of an electrical linear motor. In FIGS. 1a and 1b the intermediate supporting members 3 carry steel armature reaction rails 4 for the suspension and guidance, linear motor reaction rails 5, and power lines 6. The shape of the reaction rails 4 may differ as shown in FIGS. 1a and 1b.

Adjusting means 7, such as nuts and bolts located between the main beams 2 and the intermediate supporting members 3 and similar means 8 located between the piers 1 and the main beams 2 permit the accurate adjustment of the rails relative to each other and an absolutely geometrical course of the roadway.

The fact that conventional roadways for high performance rapid transit railways utilize reinforced concrete suspension structures to the exclusion of others can be attributed to the conclusion, drawn from evidence in bridge construction, that in the absence of excessive suspension spans the use of reinforced concrete as a main beam material would be the one and only economically tenable and reasonable approach. From this it was then inferred that main beams of reinforced concrete would be the only practicable approach. This bias is amply demonstrated by the view that the use of steel constructions would, right from the start and in each and every case be too costly. A factor which entirely escapes attention in these considerations is, however, that sections of high performance rapid transit railways for overhung or underhung suspension vehicles impose inherently specific requirements which are by no means identical with those in bridge construction e.g., very moderate deflection of the beams under load, particularly high natural frequency, great accuracy of roadway shape, minimization of adjusting problems and absorption of large lateral forces. The present invention overcomes this bias, and the roadways of this invention not only eliminate the current disadvantages but even afford additional new benefits.

Owing to the superior load capacity of steel compared to reinforced concrete, especially under tensile stresses, this invention permits the use of beams having substantially longer suspension spans than heretobefore. Due to the great allowable tensile stresses for steel, the use of continuous beams extending across several piers at an approximate length of 500 m is a practical and helpful advantage of the invention. For this reason, suspension structures of steel lend themselves admirably to use for roadway sections involving bridges, crossovers or similar obstacles.

FIGS. 2a and 2b illustrate two embodiments of this invention, in which concrete or steel piers 1 rest in concrete foundations 10 and carry main beams 2 of an all steel construction on intermediate bearings 9. These all steel beams may be in the form of open, trussed sections incorporating intermediate supporting ribs 14 as shown in FIG. 2a. FIG. 2b illustrates a main beam of the box section type. The suspension and guide rails here exemplified by a U-shaped rail 4 are rigidly connected to these main beams without the necessity of adjusting means. The beams also carry linear motor reaction rails 5 and power supply lines 6. At their lower ends the two oppositely disposed main beams are interconnected by means of cross-ties 13. When the main beams are of the box section construction the cross ties 13 are used only in the pier area (FIG. 2b). When the main beams have an open cross-section, the cross ties form a connection extending over the entire length of the main beams (FIG. 2a).

Figure 3:
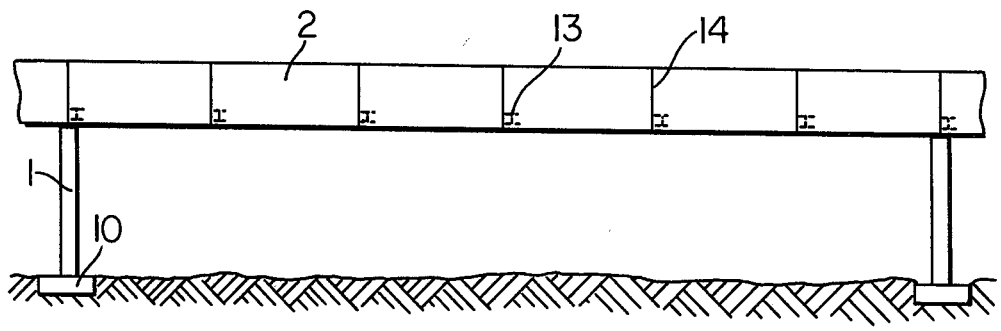
FIG. 3 is a lateral elevational view of an alternative embodiment of a roadway in accordance with this invention.

FIG. 3 is a lateral view illustrating an entire span of a suspension structure between a pair of piers 1, in accordance with this invention. FIG. 3 corresponds to a side view of the arrangement shown in FIG. 2a, in which the main beams are open shapes incorporating cross-ties 13 at their downwardly facing side. The longitudinal beam shape is braced by evenly spaced stiffening plates 14.

Figure 4:
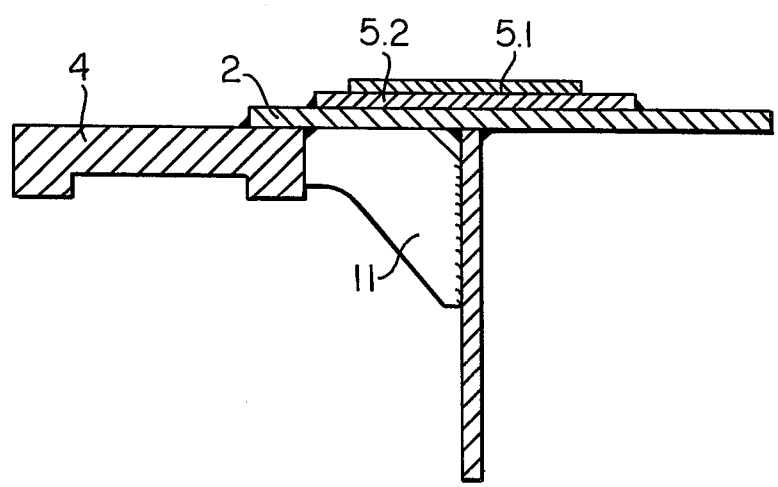
FIG. 4 is an enlarged cross sectional view of one portion of an embodiment of a suspension structure in accordance with the present invention that may be employed in the structures of FIGS. 2a and/or 2b.
Figure 5:
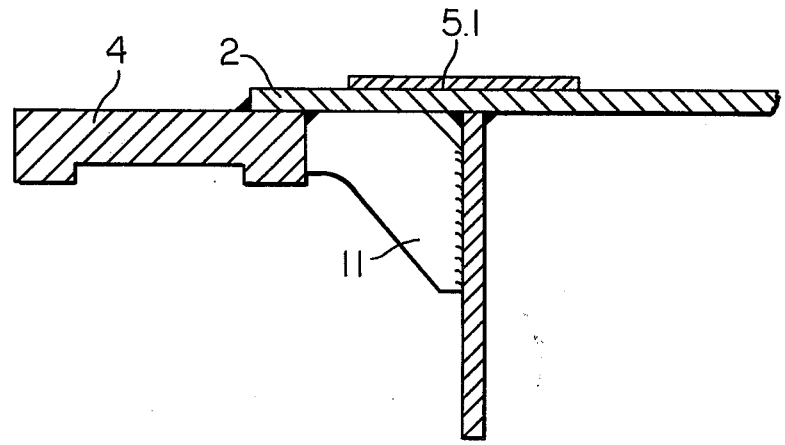
FIG. 5 is an enlarged cross sectional view of another embodiment of a suspension structure in accordance with the invention that may be employed in the structures of FIG. 2a and/or 2b.

FIGS. 4 and 5 are sectional detail views of embodiments in accordance with this invention, where the reaction rails needed when the suspension and guide means are electromagnetic and propulsion is by means of a unilaterally acting electrical linear motor, are integrated into the suspension structure as load-bearing components. The U-shaped armature reaction rail 4, which here serves as an electromagnetic suspension and guide rail, is rigidly attached, for example, by welding to its associated main beam 2. Stiffening plates 11 are arranged for additional bracing between the armature reaction rail 4 and the main beam 2. The linear motor reaction rails 5.1 and 5.2 are likewise connected to the main beam shape. In FIG. 5 the steel portion 5.2 of these linear motor reaction rails is incorporated into the main beam 2 while in FIG. 4 it is an additional part 5.2 which is rigidly attached to the main beam. The aluminum portion 5.1 of this linear motor reaction rail can simultaneously serve a power supply function and so obviates the need for the power supply lines 6 of FIG. 1 or FIG. 2.

FIG. 6 is a cross-sectional detailed view of a structural embodiment of a steel suspension structure in accordance with the present invention, in which tubing systems 12 are additionally integrated into the suspension structure as load-bearing elements. The tubing systems are suitably combined with the suspension structure for additionally conveying liquids, gases or the like or for routing electrical superconducting lines alongside the track of the roadway.

The structures according to the invention are less bulky than reinforced concrete and hence the present structures are less visible in the country side than prior art structures. The appearance is less ponderous and awkward and its effect on the landscape is thus less disruptive.

The use of steelwork for the main beams also affords advantages with respect to the dimensional accuracy of the track structure and also of the course of the track. By means of current steel construction practice the various track components may be manufactured with rather high precision involving tolerances of only ±2 mm. It is further possible to pre-design into the entire suspension structure, bends or differences in elevation of the course of a track in any desirable shape. The need for approximation of the course or bend by polygonal approximations which is unavoidable in the case of concrete beams, is thus eliminated.

The simple handling as well as the possibilities of combining and varying structural features where the main beams are of an all-steel construction, provides further benefits for rapid transit railways. Thus, additional parts, such as suspension rails, guide rails and conductor rails, may be installed with a maximum of accuracy and simplicity. Due to the great dimensional accuracy the need for a second, independent adjusting means is eliminated, which in turn is accompanied by a substantial reduction in cost. Also, and this is an important point, the various track components can be manufactured in the shop, including the drilling of holes, cutting of threads, etc., needed for the attachment of additional or stiffening elements. Compared with on-site manufacture, which in the case of reinforced concrete beams is unavoidable, the cost of labor can be appreciably reduced. A still further advantage resides in the resulting ease of disassembly and in the re-usability of steel railways, which is a very important consideration in experimental systems or systems built for temporary use, for example, for large fairs and the like.

In addition to the foregoing advantages, a roadway assembled in accordance with this invention provides still another important advantage over conventional constructions by its lower structural weight. The transportation of track components is thus simpler and cheaper. Additionally, when steelwork is used, the necessary high natural frequency can be achieved much more readily and at less expense than with reinforced concrete constructions.

The cost of steel, pound by pound, is admittedly higher than reinforced concrete. However, the economies attending steel constructions in terms of labor, especially when the roadway is constructed with due regard to steel construction rather than reinforced concrete, makes roadway construction of steel quite competitive with concrete construction when cost is a consideration. On top of this, an all-steel construction eliminates the disadvantages of reinforced concrete and has additional advantages of its own as set forth above.

Although the invention has been described with reference to specific example embodiments, it is to be understood that it is intended to cover all modifications and equivalents within the scope of the appended claims.

What is claimed is:

1. In a railroad track for a high performance rapid transit railway employing overhang and underhang suspension vehicles of the type comprising a support structure including supporting means and guide devices, whereby said support structure is either formed as a solid girder, or as a framework or truss work, the improvement wherein the support structure further comprises two longitudinally extending main girders arranged opposite each other, and at least one reaction rail rigidly mounted with respect to said main girders and positioned for receiving an electro-magnetic effect, said reaction rail being mounted to constitute a supporting element of the supporting structure, wherein said two main girders have open cross sections, and wherein said supporting means comprise supporting columns as well as cross struts interconnecting said main girders and arranged adjacent the bottoms of the main girders in the area of said supporting columns.

2. The railroad track of claim 1, wherein said main girders have hollow box-shaped open cross sections.

3. The railroad track of claim 1, wherein said reaction rail is made of steel.

4. The railroad track of claim 1, wherein said reaction rail is made of a non-ferrous metal.

5. The railroad track according to claim 1, wherein the reaction rail is a current conductor.

6. The railroad track according to claim 1 for use with a vehicle carrying the moving portion of a linear motor, wherein said reaction rail constitutes the stator of said linear motor.

7. The railroad track according to claim 1, wherein said support structure is positioned to rest on said supporting columns.

8. The railroad track according to claim 1, wherein said support structure further comprises conduit piping as a supporting means.

9. The railroad track according to claim 8, wherein the conduit pipes serve for the transport of containers.

10. The railroad track of claim 8, wherein at least some of the conduit pipes serve for containing electrical long distance super conductors.

11. A railroad track for a high performance rapid transit railway for supporting a vehicle of the type carrying the moving portion of a linear motor, comprising a pair of horizontally, spaced apart structural steel beams, first reaction rail means rigidly affixed to at least one of said beams to form a load bearing element of the respective beam, whereby said beams and first rail means together constitute the support structure of said tracks, said reaction rail means being positioned to receive electromagnetic effects from a linear motor of a vehicle on said track, and further comprising second U-shaped armature reaction rail means also rigidly secured to at least one of said beams for electro-magnetic suspension and guiding of said vehicle, whereby both of said reaction rail means constitute load bearing components of the track.

12. The railroad track of claim 11, wherein said beams have substantially flat tops, said first reaction rail means being affixed to the top of at least one of said beams.

13. The railroad track of claim 12, wherein said first reaction rail means comprises an aluminum plate secured in a flat position to said one beam, whereby said first reaction rail means becomes part of said one beam.

14. The railroad track of claim 12, wherein said reaction rail comprises a steel plate lying flat on said one beam, and an aluminum plate lying flat on said steel plate.

\* \* \* \* \*

UNITED STATES PATENT OFFICE
CERTIFICATE OF CORRECTION

Patent No. 3,930,451     Dated 3,930,451

Inventor(s) Werner Huebner et al

It is certified that error appears in the above-identified patent and that said Letters Patent are hereby corrected as shown below:

Claim 1, line 2 change "overhang and underhang" to

--overhang or underhang--

Signed and Sealed this eleventh Day of May 1976

[SEAL]

Attest:

RUTH C. MASON
Attesting Officer

C. MARSHALL DANN
Commissioner of Patents and Trademarks